US006213430B1

(12) United States Patent
Spandorf

(10) Patent No.: US 6,213,430 B1
(45) Date of Patent: Apr. 10, 2001

(54) VEHICLE LAUNCH SYSTEM HAVING AN ACOUSTIC INSULATOR

(75) Inventor: Fredric S. Spandorf, Long Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/225,666

(22) Filed: Jan. 5, 1999

(51) Int. Cl.[7] ............................... B64G 1/00; B64G 1/22
(52) U.S. Cl. ............................................. 244/158 R
(58) Field of Search ........................... 244/158 R, 173

(56) References Cited

U.S. PATENT DOCUMENTS

| 3,109,607 | * | 11/1963 | Lally ............................... 244/158 R |
| 3,364,631 | * | 1/1968 | Pleasants ........................... 244/173 X |
| 4,770,374 | * | 9/1988 | Regipa ............................... 244/158 R |
| 5,044,579 | * | 9/1991 | Bernasconi et al. .............. 244/158 R |

* cited by examiner

Primary Examiner—Robert P. Swiatek
(74) Attorney, Agent, or Firm—Michael S. Yatsko

(57) ABSTRACT

A vehicle launch system having an acoustic insulator, wherein the acoustic insulator is an inflatable assembly disposed between a shroud and a spacecraft vehicle and containing gaseous material for dampening the acoustic noise effect in a spacecraft vehicle ferrying cavity during the initial vehicle launch stages.

13 Claims, 5 Drawing Sheets

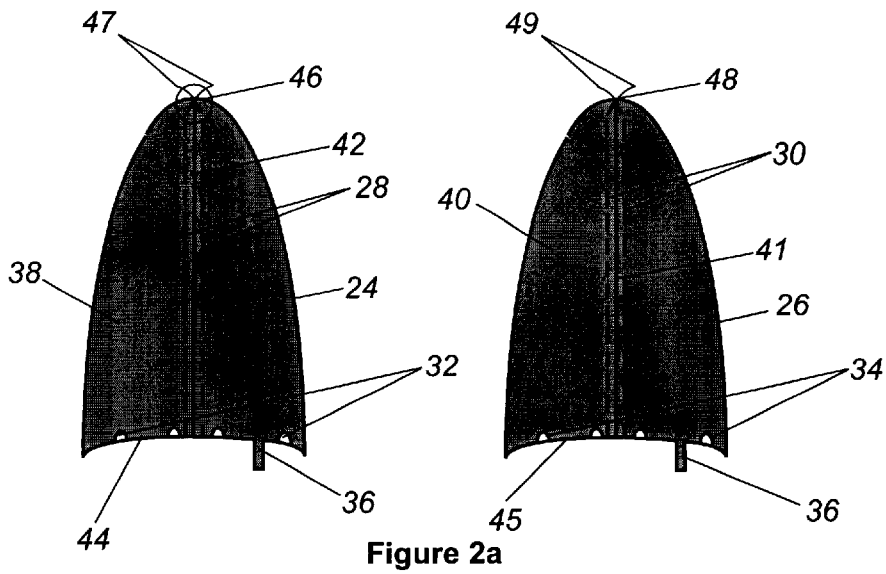
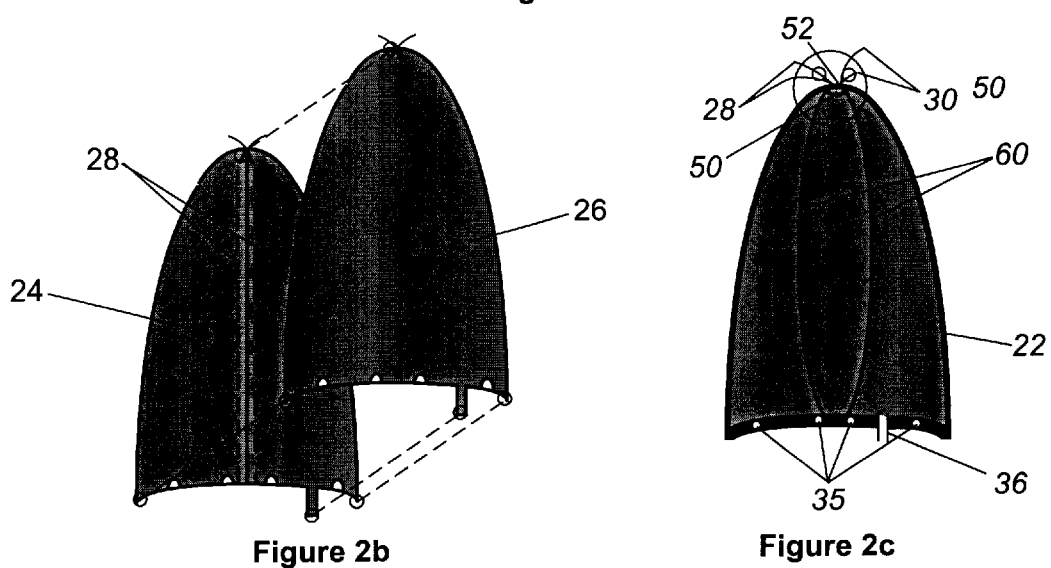
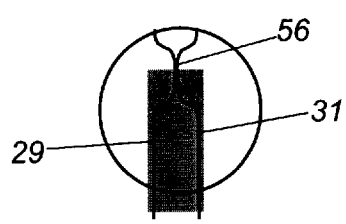
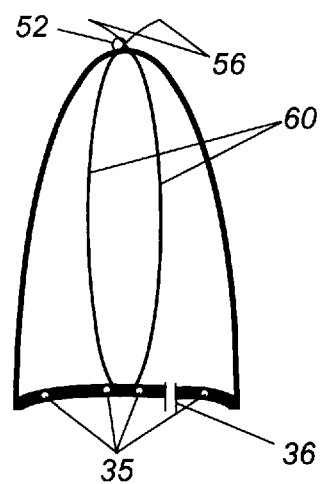
Figure 2a
Figure 2b
Figure 2c
Figure 2d
Figure 2e

VEHICLE LAUNCH SYSTEM HAVING AN ACOUSTIC INSULATOR

BACKGROUND OF THE INVENTION

1. Field of the Invention

The present invention relates generally to vehicle launch systems, and more specifically to a vehicle launch system having an acoustic insulator for absorbing the acoustic energy generated during the initial stages of a space vehicle launch.

2. Description of the Prior Art

Traditionally, launchable spacecraft vehicles are enclosed in a protective shroud and mounted onto a high power launch vehicle which is used to propel the spacecraft vehicle into space. During the first three minutes of a launch, a significant amount of acoustic noise (or vibration) is generated at the launch vehicle, traveling up the sides of the spacecraft vehicle where it is conducted off the interior surface of the protective shroud. This conduction of the acoustic energy within the confined area between the spacecraft and the shroud causes the spacecraft components and electronics to be subjected to a high concentration of acoustic vibration. The acoustic vibration reaches levels that may cause structural damage to the spacecraft vehicle components and electronics.

Present launch systems use a variety of techniques to reduce the impact of acoustic vibration on the launchable spacecraft. One such technique requires spacecraft vehicle components that are structurally robust and have unique energy absorbing characteristics sufficient to survive extreme acoustic vibration. A second technique provides the use of a barrier between the source of the acoustic vibration and the spacecraft vehicle. The barrier is created by filling the area between the shroud and the spacecraft vehicle with a gaseous material that insulates the spacecraft from the extreme acoustic environment. However, each of the described conventional approaches has inherent drawbacks.

Regarding the first technique, building structurally robust components that are energy absorbent may require heavier components, special materials and additional design steps. As the overall weight of the spacecraft is increased, the amount of fuel required launching the spacecraft increases. Special energy absorbing materials and additional design steps further increase the spacecraft vehicle fabrication costs.

Regarding the second technique, creating a barrier from gaseous materials, typically helium, has been found to enable low voltage arcing within the electronic circuitry of the spacecraft vehicle. The low voltage arcing occurs when the unconfined gaseous material seeps into the electronic circuitry of the spacecraft.

Based on the techniques known in the art for reducing the acoustic vibration effect on launchable spacecraft vehicles, a vehicle launch system having an acoustic insulator which, maintains vehicle weight limitations, decreases overall launch costs and eliminates low voltage arcing effects is highly desirable.

SUMMARY OF THE INVENTION

It is an aspect of the present invention to provide a vehicle launch system having an acoustic insulator. Briefly, the vehicle launch system includes a spacecraft disposed on a launch vehicle where the launch vehicle has a means for launching the spacecraft. The vehicle launch system further includes a shroud extending from the launch vehicle forming a ferrying cavity whereby the shroud encloses the spacecraft. Disposed between the shroud and spacecraft is an inflatable, flexible element where the inflatable, flexible element contains a gaseous material having a means for dampening the acoustic vibration concentrated within the ferrying cavity.

BRIEF DESCRIPTION OF THE DRAWINGS

Reference is now made to the following specification and attached drawings, wherein:

FIG. 2a is an illustration of the elements of an acoustic insulating balloon subassembly in accordance with the preferred embodiment of the present invention;

FIG. 2b is an isometric illustration of an acoustic insulating balloon subassembly in accordance with the preferred embodiment of the present invention;

FIG. 2c is a front view illustration of an acoustic insulating balloon subassembly in accordance with the preferred embodiment of the present invention;

FIG. 2d is an illustration of an integral tear-cord configuration in accordance with the preferred embodiment of the present invention;

FIG. 2e is a front view illustration of a fully assembled acoustic insulating balloon subassembly in accordance with the preferred embodiment of the present invention;

DETAILED DESCRIPTION OF THE INVENTION

Figure 1:
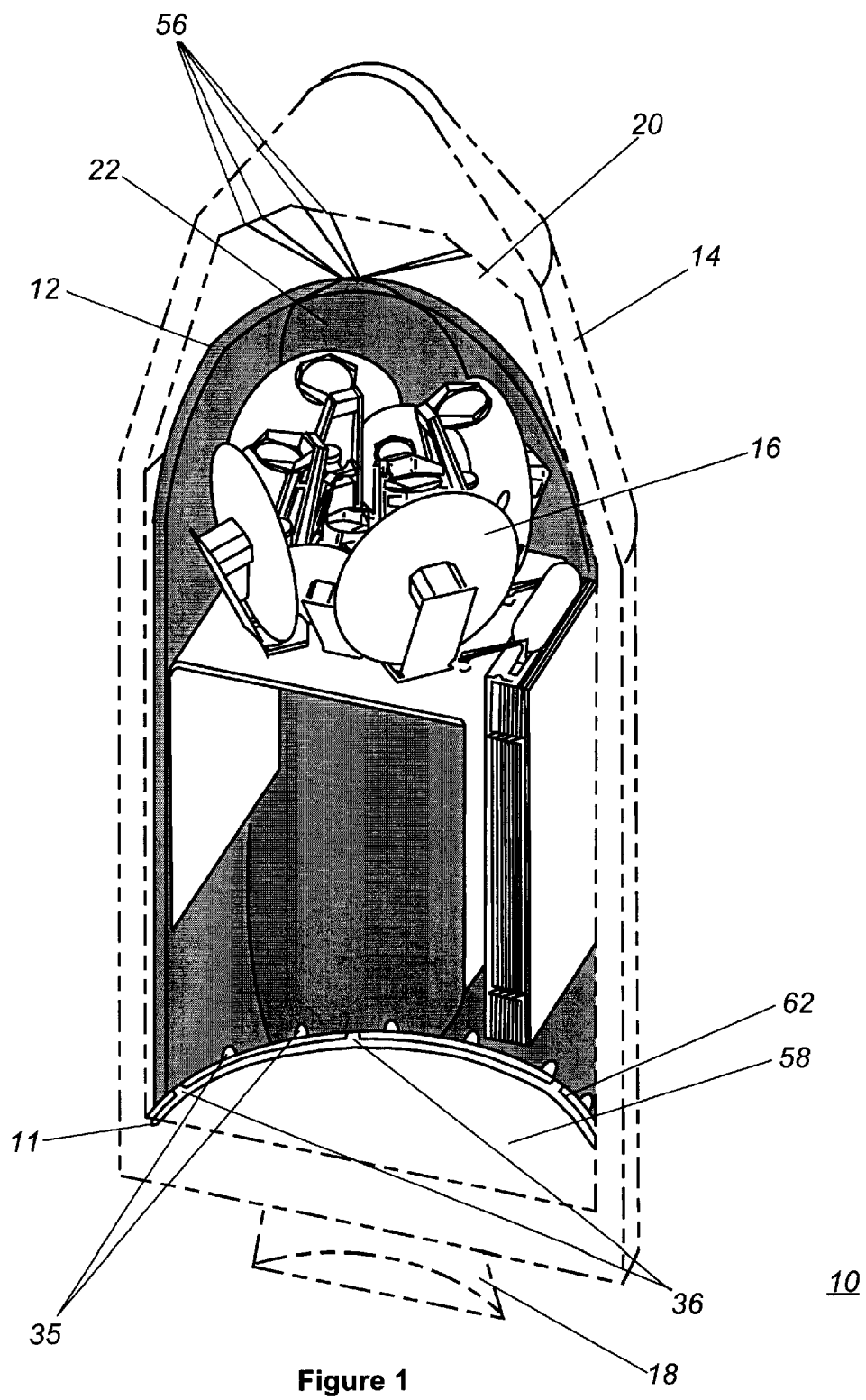
FIG. 1 is an illustration of a vehicle launch system including an acoustic insulating balloon assembly in accordance with a preferred embodiment of the present invention.

Referring to FIG. 1, the present invention relates to vehicle launch system 10 and, more particularly, to an acoustic insulating balloon assembly 12 located on the inside of a launch vehicle payload fairing 20. The acoustic insulating balloon assembly 12 of the present invention is utilized to dampen the effects of acoustic energy (vibration) on a spacecraft 16 during the first three minutes of lift-off. The balloon assembly 12 is filled with a gaseous material and forms a confined volume around the spacecraft 16. Insulating the spacecraft 16 with the balloon assembly 12 provides a contained barrier between the launch vehicle shroud 14 and the spacecraft 16 protecting the spacecraft 16 from the effects of high acoustic vibration. It is important to note that the present invention is not limited to space launch applications, but may also be utilized to dampen acoustic effects in missile and other applications having concentrated payload compartments on board.

Referring to FIGS. 2a through 2e, an acoustic insulating balloon assembly 12 (see FIG. 1) is constructed from a plurality of subassemblies, further referenced herein as balloon subassemblies 22. Each balloon subassembly 22 includes an inner membrane 24, an outer layer 26, a plurality of tear-off cords (28, 30), a plurality of eyelets (32, 34) and a fill shaft 36. As illustrated in FIG. 2a, the inner membrane 24 is generally parabolically shaped and closely matches the shape of the spacecraft 16 previously illustrated in FIG. 1. The inner membrane 24 is preferably a polyester film material such as Mylar™ that is chosen for its low weight properties and compatibility with thermal bonding processes. The polyester film material used for the inner membrane 24 is to be thick enough to avoid easily snagging on the spacecraft surfaces, preferably from approximately 0.0005 to 0.010 inches.

A plurality of inner tear-off cords 28 are attached to a surface 38 of the inner membrane 24 parallel to the central vertical axis 42 of the inner membrane 24. The tear-off cords 28 provide a means for attaching the balloon subassembly 22 to the interior surface of the shroud 14 (illustrated in FIG. 1) and are preferably of a para-aramid fiber material such as Kevlar™ which is strong and low-weight. For the purposes of the preferred embodiment, two inner tear-off cords 28 are illustrated, each spaced from the other and thermally bonded to the surface 38 of the inner membrane 24 from a base 44 to a vertex 46. The tear-off cords 28 extend beyond the vertex 46 and terminate at an end 47. To provide additional attachment of the balloon subassembly 22 to a shroud section, the inner membrane 24 utilizes a plurality of eyelet attachments 32 extending along a base 44. Alternatively, the eyelet attachments 32 may be tabs constructed as an extension of the balloon subassembly 22 or loops constructed as extensions of the tear-off cords 28. The eyelet attachment selection is determined by the requirements of the shroud 14.

The outer layer 26 of the balloon subassembly 22 is generally parabolically shaped and is fabricated of the same polyester film material as described for the inner membrane 24. The polyester film material used for the outer layer 26 is to be thick enough to retain the pressure of the gaseous material contained in the balloon subassembly 22 and resist puncture against the shroud 14, preferably from approximately 0.001 to 0.005 inches. The outer layer 26 contains a plurality of outer tear-off cords 30 attached in the manner similar to that described for the inner membrane 24. Starting at a base 45, extending to a vertex 48 and parallel to the central vertical axis 41, the plurality of outer tear-off cords 30 are attached to a surface 40 of the outer layer 26. The tear-off cords 30 extend beyond the vertex 48 and terminate at an end 49. As described with the inner membrane 24, the tear-off cords 30 and eyelets 34 provide a means for attaching the balloon subassembly 22 to the interior surface of the shroud 14.

Illustrated in FIGS. 2b and 2c, using a thermal bonding or similar process, the outer layer 26 is circumferentially attached to the inner membrane 24 forming a closed volume subassembly 22. Prior to attachment, the inner tear-off cords 28 are aligned coincident and proximal to the outer tear-off cords 30 and the inner and outer tear-off cords (28,30) form bond lines 60 and at the vertex 52 of the balloon subassembly 22. Next, the cords (28, 30) are extended through a small thermally sealed hole 50 located at the vertex 52 of the balloon subassembly 22. As illustrated in FIG. 2c, a pair of inner cords 28 and a pair of outer cords 30 extend through the vertex 52 of the subassembly 22. Next, as illustrated in FIG. 2d, a single member 29 of the inner cord pair 28 is attached to a single member 31 of the outer cord pair 30 forming an integral cord 56. As shown in FIG. 2e, the resultant number of integral cords 56 per subassembly 22 is equal to one-half the total number of tear-off cords.

Figure 3:
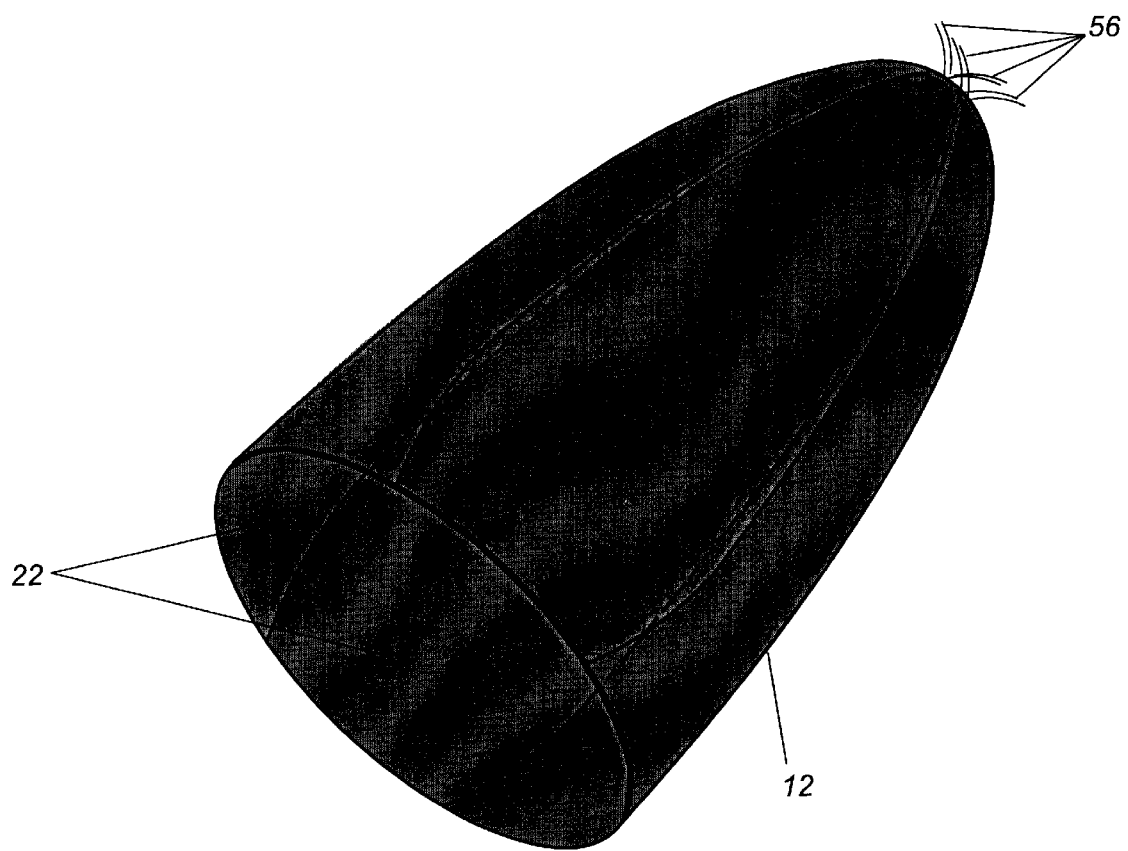
FIG. 3 is an illustration of an acoustic insulating balloon assembly in accordance with the preferred embodiment of the present invention.
Figure 5:
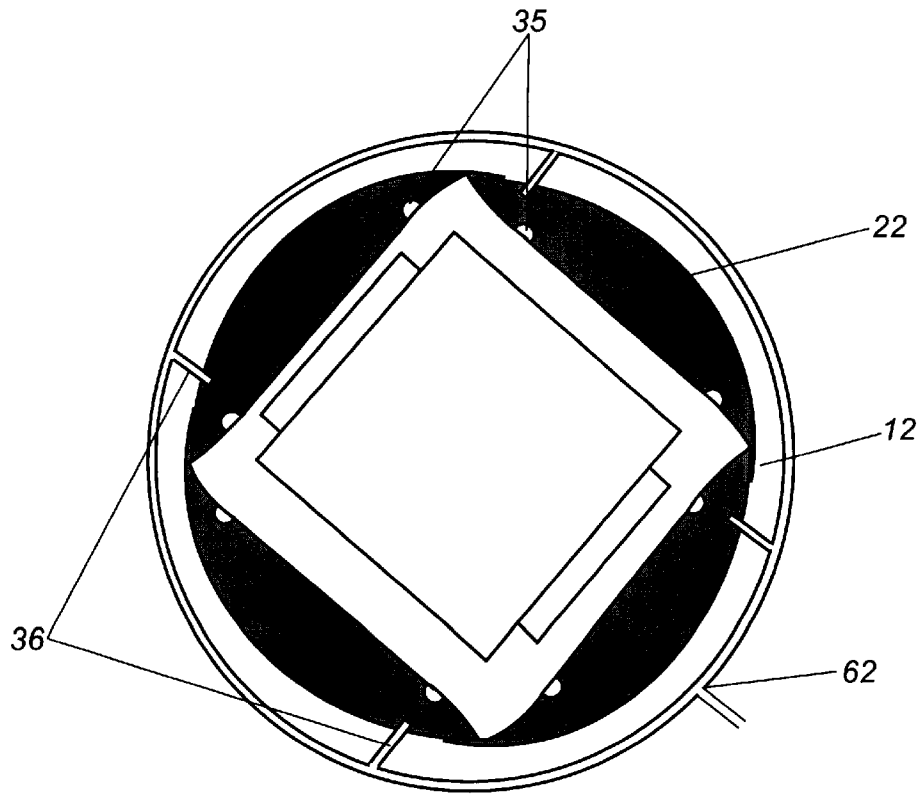
FIG. 5 is a bottom view illustration of an acoustic insulating balloon assembly attached to vehicle launch system shroud in accordance with the preferred embodiment of the present invention.

Next, as illustrated in FIG. 3, the balloon subassemblies 22 are circumferentially seamed together by a thermal process to form a balloon assembly 12 having a hollow shape and approximating the shape of the launch system shroud 14 shown in FIG. 1. As further illustrated in FIG. 5, a fill tube 62 is integrally attached to each balloon subassembly 22 fill shaft 36 forming a fully integrated balloon assembly 12.

Figure 4:
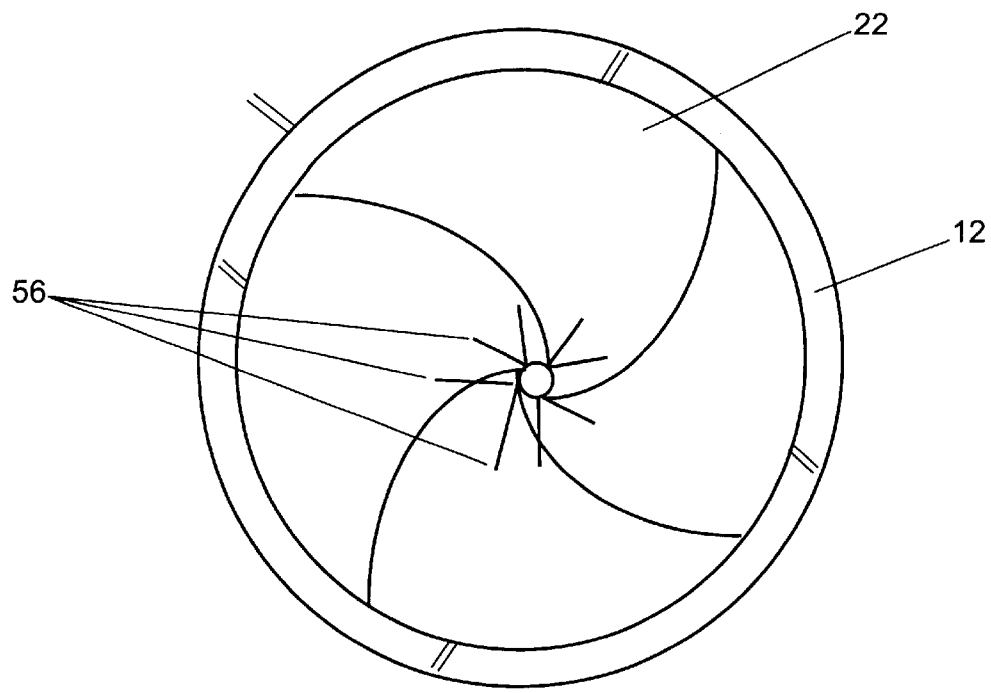
FIG. 4 is a top view illustration of an acoustic insulating balloon assembly in accordance with the preferred embodiment of the present invention.

During the integration of the spacecraft 16 and the shroud 14 to the launch vehicle 18, the balloon assembly 12 is attached to the interior surface of the shroud 14. As illustrated in FIGS. 1 and 4, each integral tear-off cord 56 (two cords per balloon subassembly 22) is attached to a segment of the top interior surface of the shroud 14. Specifically, the tear-off cords 56 are evenly distributed and attached circumferentially to the top interior surface of the shroud 14. The eyelets 35 of the balloon assembly 12 are circumferentially secured to the shroud base 58 and the fill tube 62 is attached to an access port 11 on the shroud 14. Next, as illustrated in FIG. 1, the shroud 14 is placed over the spacecraft 16, attached to the launch vehicle 18 and the balloon assembly 12 inflated with a gaseous material at the access port 11. The preferred gaseous material, helium, is chosen for its low transmission ratio (TR) properties.

Figure 6:
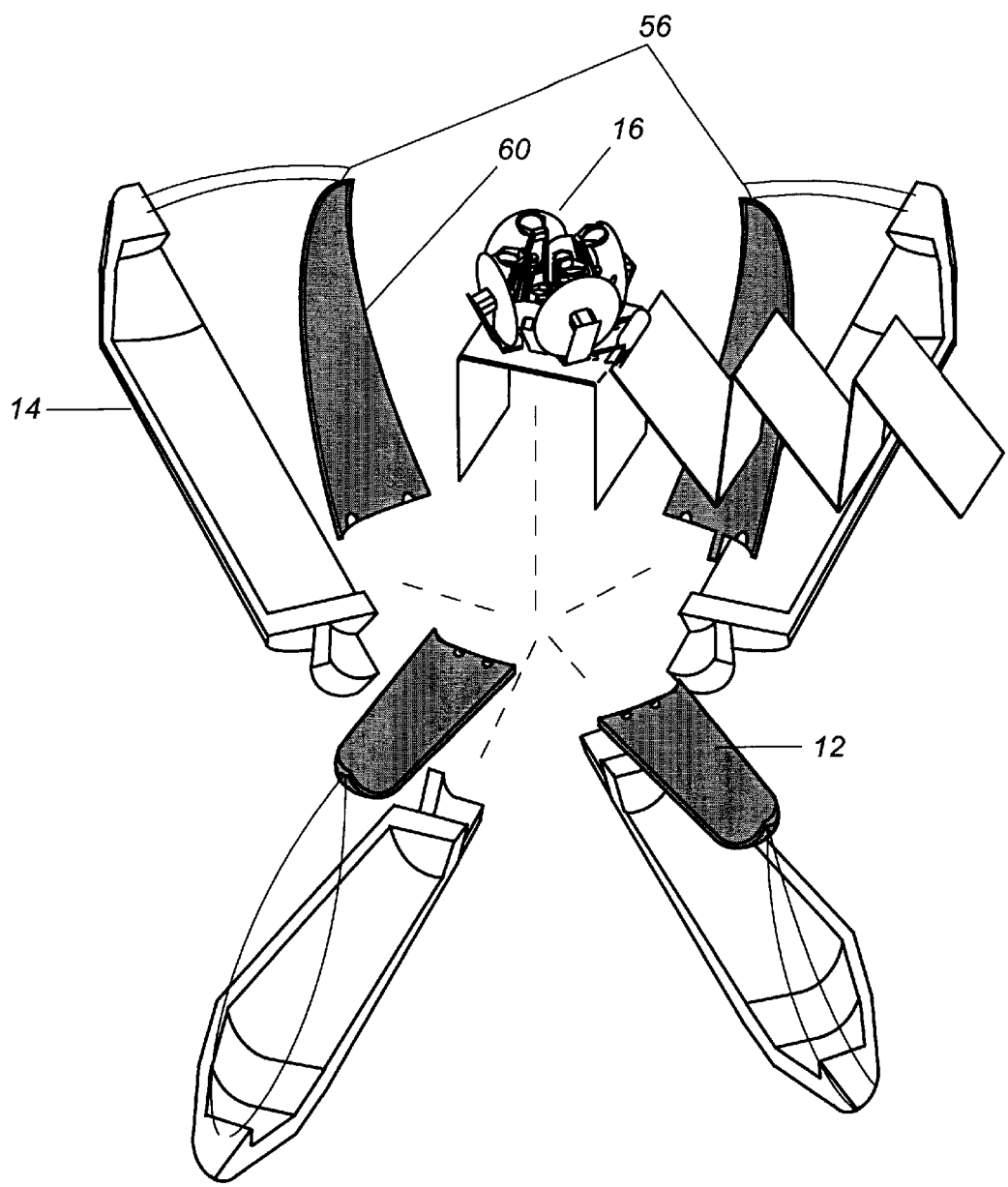
FIG. 6 is an illustration of an acoustic insulating balloon assembly collapsing from a spacecraft vehicle following the first stage of a launch sequence.

Finally, the vehicle launch system 10 described in the present invention is fully assembled for launch. As previously mentioned, the first three minutes of the launch of any spacecraft from a ground based facility induces an enormous acoustic vibration upon the shroud of the launch vehicle. The acoustic vibration on the shroud is then induced onto the spacecraft. As illustrated in FIG. 6, after the first three minutes of the launch, the spacecraft 16 propels upward into the earth's atmosphere and the shroud 14 separates, after reaching a predetermined altitude, into multiple sections. The splitting of the shroud 14 pulls the cords 56 causing the balloon assembly 12 to rip along the bond lines 60 (see FIG. 2c) to form a cleanly segmented blanket attached to the top and bottom of the shroud 14. The splitting and falling away of the shroud 14 and balloon assembly 12, allow the spacecraft 16 to continue in an upward motion without impediment.

Obviously, many modifications and variations of the present invention are possible in light of the above teachings. Thus, it is to be understood that, within the scope of the appended claims, the invention may be practiced otherwise than as specifically described above.

What is claimed is:

1. A vehicle launch system, comprising:
    a vehicle disposed on a base element, said base element having a means for launching said vehicle;
    a shroud extending from said base element forming a ferrying cavity and having an interior surface, whereby said shroud encloses said vehicle; and
    an inflatable, flexible element disposed between said shroud and said vehicle and having a means for dampening acoustic vibration; said inflatable, flexible element being formed of a plurality of circumferentially joined sub-elements wherein each said sub-element comprises:
        a generally parabolically shaped inner membrane having a first base, a first vertex and a first vertical axis extending from said first base to said first vertex;
        an inner cord attached on a surface of said inner membrane, said inner cord being parallel to said first vertical axis and extending beyond said first vertex to a first end;
        a generally parabolically shaped outer layer having a second base, a second vertex and a second vertical axis extending from said second base to said second vertex;

an outer cord attached on a surface of said outer layer, said outer cord being parallel to said second vertical axis and extending beyond said second vertex to a second end; and said outer layer circumferentially joined to said inner membrane except at said, first and second vertices forming a closed volume having an opening at said first and second vertices where said outer cord is parallel and proximal to said inner cord and said outer and inner cords extend through said opening.

2. A vehicle launch system as recited in claim 1, wherein said base element is a launch vehicle.

3. A vehicle launch system as recited in claim 1, wherein said vehicle is a spacecraft vehicle.

4. A vehicle launch system as recited in claim 1, wherein said inflatable, flexible element contains a gaseous material.

5. A vehicle launch system as recited in claim 4, wherein said gaseous material is helium.

6. A vehicle launch system as recited in claim 1, wherein said inflatable, flexible element is made of a polyester film material.

7. A vehicle launch system as recited in claim 1, wherein said inner and outer cords are attached at said first and second vertices extending to said first and second ends to form an integral cord.

8. A vehicle launch system as recited in claim 7, wherein said integral cord is attached to said shroud interior surface.

9. A vehicle launch system as recited in claim 7, wherein said integral cord is made of para-aramid material.

10. A vehicle launch system as recited in claim 1, wherein said first base includes means for attaching said inflatable flexible element to said shroud base.

11. A vehicle launch system as recited in claim 10, wherein said inflatable flexible element attaching means is selected from the group consisting of eyelets, tabs, and loops.

12. A vehicle launch system as recited in claim 1, wherein said second base includes a means for attaching said inflatable flexible element to said shroud base.

13. A vehicle launch system as recited in claim 12, wherein said inflatable flexible element attaching means is selected from the group consisting of eyelets, tabs, and loops.

* * * * *